(12) United States Patent
Fukumoto (10) Patent No.: US 10,680,522 B2
(45) Date of Patent: Jun. 9, 2020

(54) SWITCHING REGULATOR AND CONTROL DEVICE THEREFOR

(71) Applicant: Rohm Co., Ltd., Kyoto (JP)

(72) Inventor: Yosuke Fukumoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 15/890,602

(22) Filed: Feb. 7, 2018

(65) Prior Publication Data
US 2018/0226877 A1    Aug. 9, 2018

(30) Foreign Application Priority Data

Feb. 9, 2017 (JP) ................................ 2017-022370
Dec. 22, 2017 (JP) ................................ 2017-246421

(51) Int. Cl.
*H02M 3/158* (2006.01)
*H02M 1/00* (2006.01)

(52) U.S. Cl.
CPC .. *H02M 3/1588* (2013.01); *H02M 2001/0009* (2013.01); *Y02B 70/1466* (2013.01)

(58) Field of Classification Search
CPC ........ H02M 2001/0009; H02M 3/1588; Y02B 70/1466
See application file for complete search history.

(56) References Cited

U.S. PATENT DOCUMENTS

| 7,859,244 | B1 * | 12/2010 | Krishnamoorthy ... | H02M 3/155 323/224 |
| 9,748,842 | B1 * | 8/2017 | Devarajan ............... | H02M 1/08 |
| 10,063,146 | B1 * | 8/2018 | Lee ......................... | G01R 15/18 |
| 2005/0035748 | A1 * | 2/2005 | Inn ........................ | H02M 3/1588 323/285 |

(Continued)

FOREIGN PATENT DOCUMENTS

| EP | 2546966 | 1/2013 |
| JP | 2011-135629 | 7/2011 |

(Continued)

OTHER PUBLICATIONS

Sheehan, Robert. "Understanding and applying current-mode control theory." Texas Instruments Lit. No. SNVA555. Presented on Oct. 31, 2007 at Power Electronics Technology Exhibition Conference, Dallas TX. Retrieved from http://www.ti.com/lit/an/snva555/snva555.pdf on May 20, 2019. (Year: 2007).*

(Continued)

*Primary Examiner* — Fred E Finch, III
(74) *Attorney, Agent, or Firm* — Fish & Richardson P.C.

(57) ABSTRACT

A control device serves as an agent that controls a switching regulator including an output switch and a synchronous rectification switch. The control device includes: a summator generating a sum sense signal by adding up a first sense signal commensurate with the current passing in the output switch and a second sense signal commensurate with the current passing in the synchronous rectification switch; a (Continued)

smoother generating a smoothed sense signal by smoothing the sum sense signal; and a switch driver driving the output switch and the synchronous rectification switch complementarily through current mode control based on the smoothed sense signal.

18 Claims, 8 Drawing Sheets

(56) References Cited

U.S. PATENT DOCUMENTS

| | | | |
|---|---|---|---|
| 2006/0113980 A1* | 6/2006 | Yoshida | H02M 3/1588 323/282 |
| 2008/0048631 A1* | 2/2008 | Kim | H02M 3/157 323/283 |
| 2012/0229107 A1* | 9/2012 | Chen | H02M 3/1588 323/271 |
| 2013/0015830 A1 | 1/2013 | Zhang | |
| 2013/0057245 A1* | 3/2013 | Hirotsu | H02M 7/53803 323/312 |
| 2013/0063113 A1* | 3/2013 | Couleur | H02M 3/1588 323/282 |
| 2013/0083566 A1* | 4/2013 | Gaknoki | H02M 3/33515 363/21.17 |
| 2013/0293211 A1* | 11/2013 | Chen | H02M 3/1588 323/282 |
| 2015/0377933 A1* | 12/2015 | Alcouffe | G01R 19/257 324/126 |
| 2016/0011610 A1* | 1/2016 | Hayashi | H02M 3/1588 348/730 |
| 2016/0082845 A1 | 3/2016 | Yamaguchi | |
| 2016/0118888 A1* | 4/2016 | Xu | H02M 1/36 323/235 |
| 2016/0164412 A1 | 6/2016 | Li et al. | |
| 2016/0306371 A1* | 10/2016 | Svorc | H02M 3/1588 |
| 2017/0025947 A1* | 1/2017 | Wang | H02M 3/158 |
| 2017/0126121 A1* | 5/2017 | Wang | H02M 3/158 |
| 2017/0288545 A1* | 10/2017 | Yamada | H02M 3/158 |

FOREIGN PATENT DOCUMENTS

| | | |
|---|---|---|
| JP | 2016-067113 | 4/2016 |
| WO | WO 2007/060871 A1 | 5/2007 |

OTHER PUBLICATIONS

Pajer R.etal, MOS-FET as a Current Sensor in Power Electronics Converters, Sensors, 15(8):18061-18079 (2015).
Infineon Technologies Ag: High Performance DrBlade TDA21320, Jul. 16, 2015; URL:https://www.infineon.com/dgdl/Infineon-TDA21320-DS-v02_04-EN.pdf?filedID+5546d4524933b875001493d06318e4235 (retrieved on Apr. 17, 2018).
European Patent Office, EESR for EP 18 15 5919 dated May 2, 2018.
European Patent Office; Communication pursuant to Article 94(3) EPC mailed in counterpart European Application No. 18 155 919.6 (dated Mar. 13, 2020).

* cited by examiner

FIG.3B   HIGH ON DUTY(90%)

FIG.3A   LOW ON DUTY(10%)

SWITCHING REGULATOR AND CONTROL DEVICE THEREFOR

CROSS-REFERENCE TO RELATED APPLICATIONS

This application is based on the following Japanese Patent Applications, and their contents are hereby incorporated by reference:
 (1) Japanese Patent Application published as No. 2017-022370 (filed on Feb. 9, 2017)
 (2) Japanese Patent Application published as No. 2017-246421 (filed on Dec. 22, 2017)

BACKGROUND OF THE INVENTION

1. Field of the Invention

The present invention relates to a current mode control switching regulator. More particularly, the present invention relates to a current mode control switching regulator that can eliminate the influence of ringing noise that occurs when a high-side and a low-side transistor turn ON and OFF.

2. Description of Related Art

Some conventional current mode control switching regulators achieve current mode control by sensing a current passing in at least one of a low-side and a high-side transistor.

Japanese Patent Application published as No. 2016-67113 (hereinafter "Patent Document 1") proposes current mode control switching power supplies. Patent Document 1 discloses, in FIG. 1, one that senses the current passing in the low-side transistor, in FIG. 14, one that senses the current passing in the high-side transistor, and in FIG. 11, one that senses the currents passing in both transistors.

Japanese Patent Application published as No. 2011-135629 (hereinafter "Patent Document 2") discloses a motor control device capable of current sensing without the influence of ringing noise. This type of motor control device is provided with a current sensor that senses or estimates the value of the current that passes in a connection circuit for a brushless motor in the ON period in which whichever of an upper arm switch (high-side transistor) and a lower arm switch (low-side transistor) has the higher duty factor is ON.

Patent Document 2 teaches, in paragraph 0020 (Embodiment 3), an example where the motor current is monitored constantly at each of the ON side of the upper arm switch and the ON side of the lower arm switch and the average of two sensed values is taken as the sensed current value. Patent Document 2 also suggests, in paragraph 0021, that ringing noise occurs typically with opposite phases when the upper arm switch is ON and when the lower arm switch is ON. Patent Document 2 purports to enable current sensing without the influence of ringing noise.

Patent Document 1 discloses various types of current mode control switching regulators. However, the aim there is to provide a current mode control switching regulator that is suitable irrespective of whether the ratio of the output voltage to the input voltage is low or high; it is not the aim to avoid the influence of ringing that occurs in a switching regulator.

Patent Document 2 suggests that ringing noise occurs during the switching of a high-side and a low-side transistor, and that, to avoid the influence of the ringing noise, the value of the current that passes in the upper arm switch (high-side transistor) or the lower arm switch (low-side transistor) is sensed with a current sensor in the ON period in which whichever of the arm switches has the higher duty factor is ON. This, however, makes a duty factor calculation circuit for calculating the duty factor an essential constituent element, and thus requires a complicate circuit configuration. Moreover, in this circuit configuration, the current sensor is implemented with a shunt resistor, and the shunt resistor is connected to the coil of the brushless motor, thus, the shunt resistor consumes electric power. In addition, the shunt resistor needs to be provided separately from the inverter circuitry, and this results in an increased circuit scale.

SUMMARY OF THE INVENTION

Devised to overcome the inconveniences mentioned above, the present invention aims to provide a current mode control switching regulator that can avoid the influence of ringing noise with a simple circuit configuration.

According to one aspect of the present invention, a control device that serves as an agent for controlling a switching regulator including an output switch and a synchronous rectification switch includes: a summator which generates a sum sense signal by adding up a first sense signal commensurate with the current passing in the output switch and a second sense signal commensurate with the current passing in the synchronous rectification switch; a smoother which generates a smoothed sense signal by smoothing the sum sense signal; and a switch driver which drives the output switch and the synchronous rectification switch complementarily through current mode control based on the smoothed sense signal.

Other features, elements, steps, benefits, and characteristics of the present invention will become clearer with reference to the following description of preferred embodiments thereof in conjunction with the accompanying drawings.

DETAILED DESCRIPTION OF PREFERRED EMBODIMENTS

First Embodiment

Figure 1A:
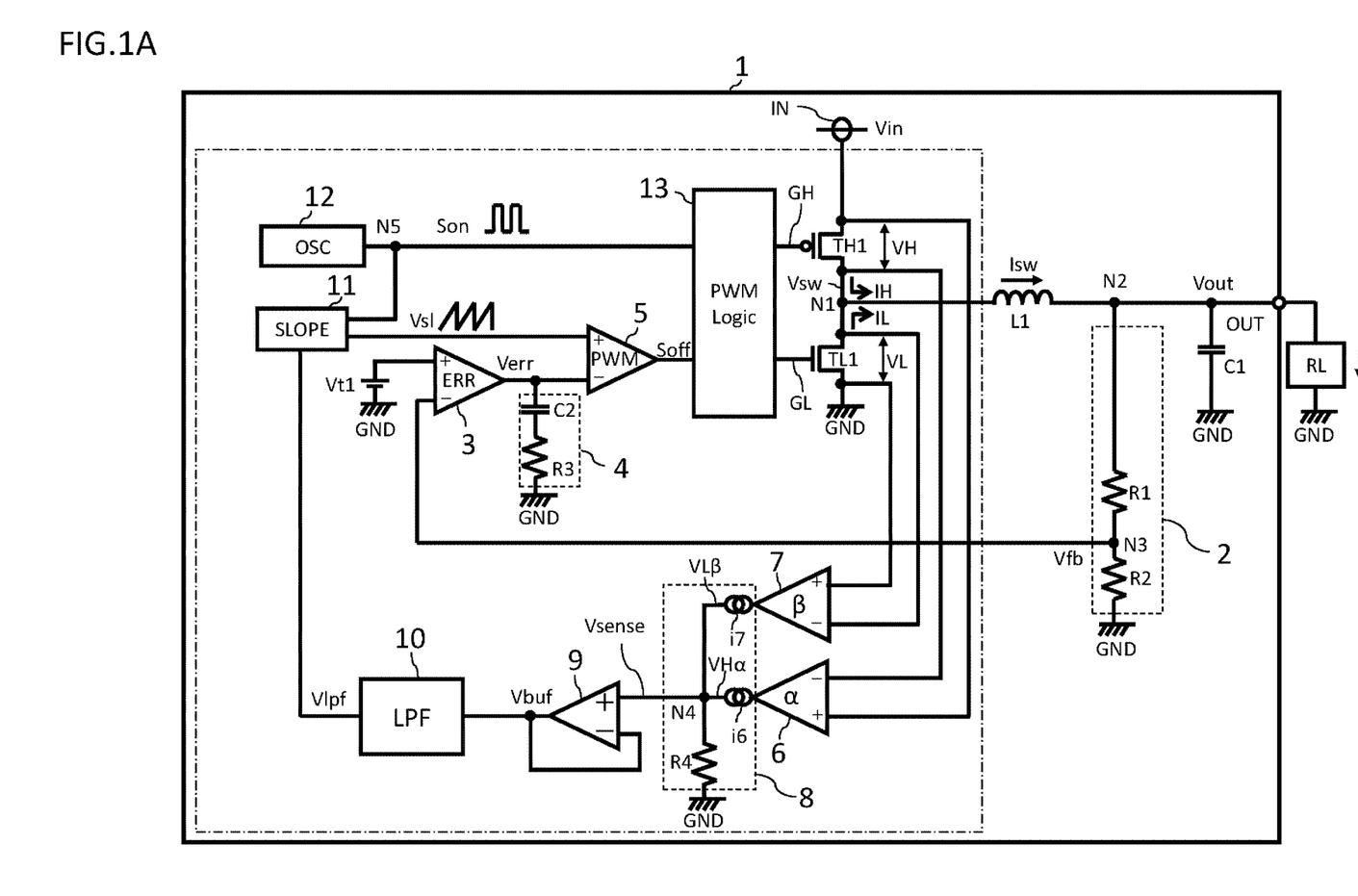
FIG. 1A is a circuit configuration diagram of an electronic device provided with a current mode control switching regulator of a step-down type (with transistors incorporated) according to a first embodiment of the present invention.
Figure 1B:
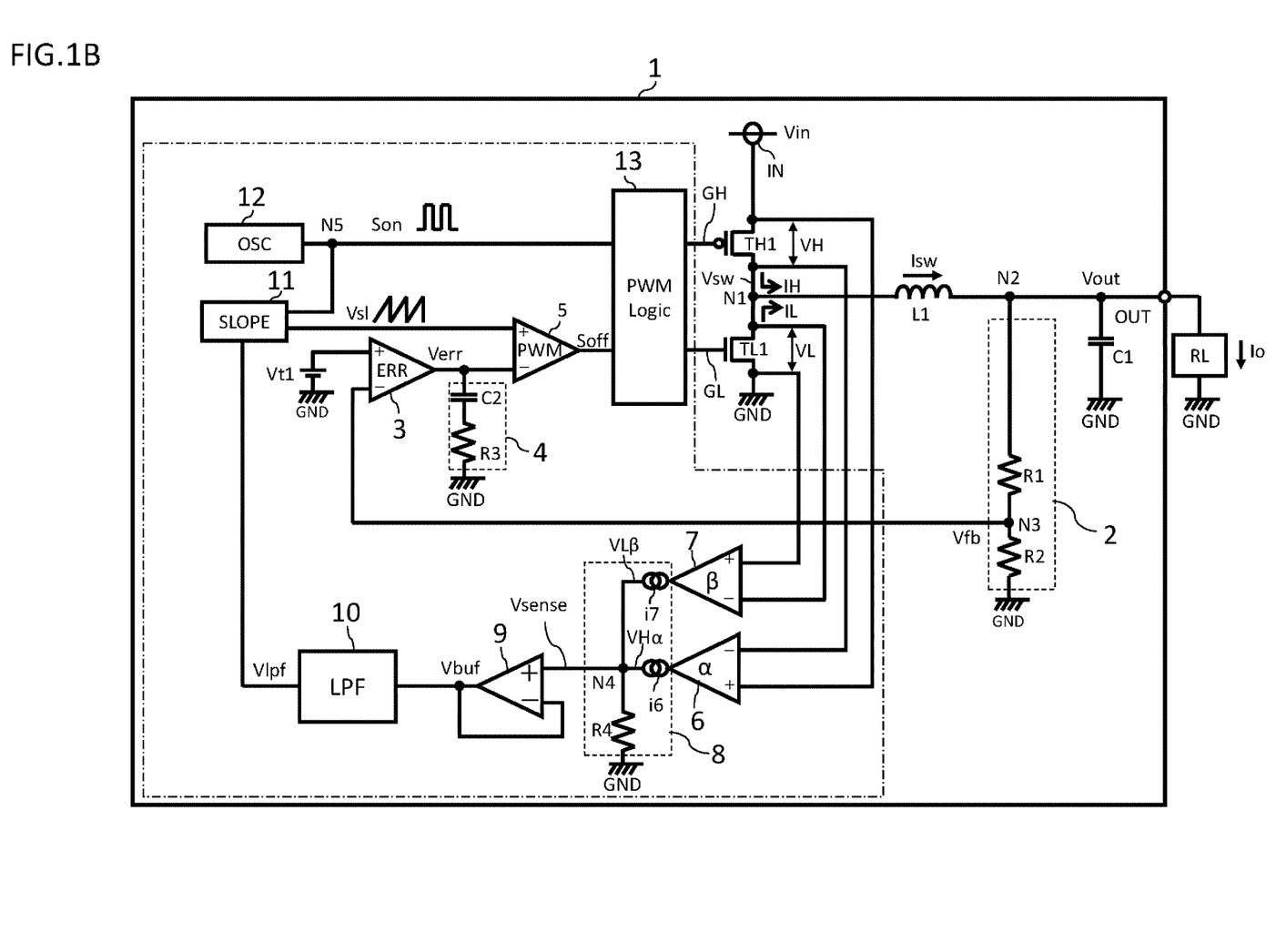
FIG. 1B is a circuit configuration diagram of an electronic device provided with a current mode control switching regulator of a step-down type (with transistors externally connected) according to the first embodiment of the present invention.

FIGS. 1A and 1B are circuit configuration diagrams of electronic devices provided with a current mode control switching regulator of a step-down type according to the present invention. In these diagrams, components enclosed in a dash-dot-line box are to be understood as components integrated in a semiconductor integrated circuit device. Embodiments of the present invention will be described below with reference to the accompanying drawing. An output voltage of an unillustrated direct-current power source such as a battery is used as an input voltage Vin to a current mode control switching regulator 1. An input terminal IN to which the input voltage Vin is applied is connected to the source of a high-side transistor TH1 (corresponding to an output switch). The drain of the high-side transistor TH1, an inductor L1, and the drain of a low-side transistor TL1 (corresponding to a synchronous rectification switch) are connected together at a node N1. The source of the low-side transistor TL is connected to a ground potential GND. The high-side transistor TH1 and the low-side transistor TL1 function as switching transistors that turn ON and OFF repeatedly based respectively on a high-side gate signal GH and a low-side gate signal GL output from a PWM (pulse width modulation) control circuit 13 and thereby control an inductor current Isw passed in the inductor L1. In the present description, with no regard to whether the circuit design is of a step-down or step-up type, a high-side transistor denotes one arranged on the source voltage side and a low-side transistor denotes one arranged on the ground potential GND side.

In FIGS. 1A and 1B, the high-side transistor TH1 is a p-channel MOS (metal-oxide-semiconductor) field-effect transistor (hereinafter referred to as a pMOS transistor), and the low-side transistor TL1 is an n-channel MOS field-effect transistor (hereinafter referred to as an nMOS transistor). As the high-side and low-side transistors TH1 and TL, IGBTs (insulated-gate bipolar transistors) or the like can also be used. The high-side and low-side transistors TH1 and TL1 may instead be bipolar transistors.

One end of the inductor L1 is connected to the node N1. The other end of the inductor L1 is connected to a node N2. To the node N2 are connected one end of a resistor R1, one end of a smoothing capacitor C1, and an output terminal OUT. The other end of the smoothing capacitor C1 is grounded. To the output terminal OUT, a load RL is connected. The load RL is, for example, a CPU. The other end of the resistor R1 is, together with one end of a resistor R2, connected to a node N3, and the other end of the resistor R2 is connected to the ground potential GND.

A feedback voltage generation circuit 2 is composed of the resistors R1 and R2, which are connected in series between the node N2 and the ground potential GND, and outputs, at the node N3, which is the connection point between those resistors, a feedback voltage Vfb.

An error amplification circuit 3 compares the feedback voltage Vfb, which is fed to an inverting input terminal of the error amplification circuit 3, with a reference voltage Vt1, which is fed to the non-inverting input terminal of the error amplification circuit 3, and outputs their difference as an error signal Verr.

A phase compensation circuit 4 serves to prevent abnormal oscillation of the current mode control switching regulator 1. The phase compensation circuit 4 is composed of a capacitor C2 and a resistor R3 that are connected in series between the output terminal of the error amplification circuit 3 and the ground terminal.

A PWM comparator 5 compares the error signal Verr, which is fed to the inverting input terminal of the PWM comparator 5, with a slope signal Vsl, which is fed to the non-inverting input terminal of the PWM comparator 5, and generates a reset signal Soff. The PWM comparator 5 outputs the reset signal Soff at the time that the error signal Verr exceeds the slope signal Vsl.

A high-side amplifier 6 (corresponding to a first amplifier) comprises, for example, an operational amplifier. The difference between the input voltage Vin, which is fed to the source of the high-side transistor TH1, and a switching voltage Vsw, which appears at the drain of the high-side transistor TH1, is taken as a high-side sense voltage VH (corresponding to a first sense signal). The high-side amplifier 6 amplifies the high-side sense voltage VH, and outputs a high-side amplified sense voltage VHα (corresponding to a first amplified sense signal). The voltage amplification factor of the high-side amplifier 6 is indicated by the symbol α. The non-inverting input terminal of the high-side amplifier 6 is connected to the source of the high-side transistor TH1, that is, to the input terminal IN. The inverting input terminal of the high-side amplifier 6 is connected to the drain of the high-side transistor TH1, that is, to the node N1. The high-side sense voltage VH is directly proportional to a high-side current IH that passes in the high-side transistor TH1. This is because, when the ON resistance of the high-side transistor TH1 is represented by RonH, the high-side sense voltage VH is given by VH=RonH×IH. Accordingly, the ON resistance RonH of the high-side transistor TH1 acts as a current-voltage converter that converts the high-side current IH into the high-side sense voltage VH. Thus, the ON resistance RonH of the high-side transistor TH1 is utilized as a high-side voltage sensor (corresponding to a first voltage sensor) according to the present invention. As the high-side voltage sensor, it is also possible to use, instead, a resistive element with a low resistance value of, for example, several ohms to ten and several ohms.

The high-side amplified sense voltage VHα output from the high-side amplifier 6 is given as the high-side sense voltage VH multiplied by the voltage amplification factor α, that is, VH×α=RonH×IH×α. The present invention adopts a design in which the output of the high-side amplifier 6 is extracted as a sense output current i6. The purpose is, as will be clarified later, to permit the high-side amplified sense voltage VHα and a low-side amplified sense voltage VHP to be added up by a summing resistor R4.

Like the high-side amplifier 6, a low-side amplifier 7 (corresponding to a second amplifier) comprises, for example, an operational amplifier. The source-drain voltage of the low-side transistor TL1, that is, the difference between the ground potential GND and the switching voltage Vsw, which appears at the node N1, is taken as a low-side sense voltage VL (corresponding to a second sense signal). The low-side amplifier 7 amplifies the low-side sense voltage VL, and outputs a low-side amplified sense voltage VLβ (corresponding to a second amplified sense signal). The voltage amplification factor of the low-side amplifier 7 is indicated by the symbol β. The non-inverting input terminal of the low-side amplifier 7 is connected to the ground potential GND, to which the source of the low-side transistor TL1 is connected. The inverting input terminal of the low-side amplifier 7 is connected to the drain of the low-side transistor TL1, that is, to the node N1. The low-side sense voltage VL is directly proportional to a low-side current IL that passes in the low-side transistor TL1. This is because, when the ON resistance of the low-side transistor TL1 is represented by RonL, the low-side sense voltage VL is given by VL=RonL×IL. Accordingly, the ON resistance RonL of the low-side transistor TL1 acts as a current-voltage converter that converts the low-side current IL into the low-side sense voltage VL. Thus, the ON resistance RonL of the low-side transistor TL1 is utilized as a low-side voltage sensor (corresponding to a second voltage sensor according to the present invention).

The low-side amplified sense voltage VLβ output from the low-side amplifier 7 is given as the low-side sense voltage VL multiplied by the voltage amplification factor β, that is, VL×β=RonL×IL×β. The present invention adopts a design in which the output of the low-side amplifier 7 is extracted as a sense output current i7. The purpose is, as will be clarified later, to permit the summation of the low-side amplified sense voltage VLβ and the high-side amplified sense voltage VLα to be carried out easily by the summing resistor R4.

As mentioned above, the low-side amplified sense voltage VLβ output from the low-side amplifier 7 is given by VLβ=VL×β=RonL×IL×β, and the high-side amplified sense voltage VHα output from the high-side amplifier 6 is given by VHα=VH×α=RonH×IH×α. In one embodiment according to the present invention, it is preferable that the equation VHα=VLβ, that is, RonH×IH×α=RonL×IL×β, be fulfilled. This makes it possible to detect ripples in the inductor current Isw.

A summator 8 (corresponding to a summator) includes the summing resistor R4. The summator 8 converts the sum current of the sense output currents i6 and i7 into a voltage, and thereby generates a composite voltage Vsense (corresponding to a sum sense signal). The composite voltage Vsense thus generated by the summator 8 is a voltage that is the sum of the high-side and low-side amplified sense voltages VHα and VHβ. The sense output current i6 is output from the output stage of the high-side amplifier 6, and the sense output current i7 is output from the output stage of the low-side amplifier 7. The sense output currents i6 and i7 can be grasped as the current output signals of the high-side and low-side amplifiers 6 and 7 respectively. The sense output currents i6 and i7 are output from the output stages with high output impedances, and thus they supply the summing resistor R4 with currents that faithfully reflect the high-side and low-side sense voltages VH and VL. Thus, in the summing resistor R4, the high-side and low-side sense voltages VH and VL can be added up without loss. In the summing resistor R4, after the sense output currents i6 and i7 are added up, the sum current is converted back into a voltage, and thus the composite voltage Vsense is generated.

A buffer 9 serves to ensure that the sum voltage Vsense output from the summator 8 in the previous stage is delivered to a low-pass filter 10 in the succeeding stage. The non-inverting input terminal of the buffer 9 is connected to the summator 8, and is fed with the sum voltage Vsense. The non-inverting input terminal and output terminal of the buffer 9 are connected together, and are connected to the low-pass filter 10 in the succeeding stage. The buffer 9 outputs a buffer output voltage Vbuf. The magnitude of the buffer output voltage Vbuf equals that of the sum voltage Vsense.

The low-pass filter 10 (corresponding to a smoother) smooths the buffer output voltage Vbuf. Thus, ringing noise contained in the buffer output voltage Vbuf is smoothed. The low-pass filter 10 outputs a low-pass filter output voltage Vlpf (corresponding to a smoothed sense signal). The low-pass filter 10 can be configured as a well-known integrating circuit composed of a combination of an operational amplifier, a capacitor, and a resistor. If the integrating effect of the integrating circuit is insufficient, ringing noise is left partly uncorrected, resulting in degraded anti-ringing noise characteristics. On the other hand, using a large CR time constant with a view to increasing the integrating effect of the integrating circuit leads to lower response of the current mode control switching regulator. Thus, the time constant of the low-pass filter 10 is determined through a tradeoff between those benefits A slope signal generation circuit 11 serves to generate the slope signal Vsl, which is a triangular-wave, sawtooth-wave, or other signal that is necessary to carry out PWM control in the current mode control switching regulator 1. The direct-current level of the slope signal Vsl is determined by the low-pass filter output voltage Vlpf from the low-pass filter 10.

An oscillator 12 is configured as, for example, a well-known CR oscillator, or a circuit composed of inverters or differential amplifiers connected in a ring. The oscillator 12 generates a set signal Son at a predetermined oscillation frequency, and feeds it to a PWM control circuit 13 in the succeeding stage. The set signal Son is also fed via a node N5 to the slope signal generation circuit 11, where it serves as a reference signal for the generation of the slope signal Vsl.

The PWM control circuit 13 receives the set signal Son, which is output from the oscillator 12, and the reset signal Soff, which is output from the PWM comparator 5, and outputs the high-side and low-side gate signals GH and GL, thereby to turn ON and OFF the high-side and low-side transistors TH1 and TL1 complementarily. The PWM control circuit 13 includes an unillustrated sequential circuit, such as an RS flip-flop. To the set terminal of the RS flip-flop, the set signal Son generated by the oscillator 12 is fed, and to the reset terminal of the RS flip-flop, the reset signal Soff output from the PWM comparator 5 is fed.

To prevent an excessive through current from passing from the high-side transistor TH1 to the low-side transistor TL1, the PWM control circuit 13 provides a so-called dead time, that is, a period in which the high-side and low-side gate signals GH and GL are both at LOW level. During the dead time, the high-side and low-side transistors TH1 and TL1 are both OFF, and thus cut the current path of a through current.

The PWM control circuit 13 is also furnished with a function of forcibly stopping the switching operation of the switching output stages in accordance with an unillustrated fault protection signal (a function of turning the signals output from the high-side and low-side transistors TH1 and TL1 to LOW level).

In FIGS. 1A and 1B, the low-side transistor TL1 operates, as a synchronous rectification transistor, in synchronism with and complementarily with the high-side transistor TH1. The low-side transistor TL1 is ON when the high-side transistor TH1 is OFF, and is OFF when the high-side transistor TH1 is ON. The low-side transistor TL1 is ON when the low-side gate signal GL is at HIGH level, and is OFF when the low-side gate signal GL is at LOW level.

As the high-side and low-side transistors TH1 and TL1 are turned ON and OFF complementarily, the switching voltage Vsw with a square waveform appears at the node N1. The switching voltage Vsw is smoothed by the inductor L1 and the smoothing capacitor C1, so that an output voltage Vout is obtained at the output terminal OUT.

In the current mode control switching regulator 1 of this configuration example, the high-side transistor TH1, the low-side transistor TL1, the inductor L1, and the smoothing capacitor C1 together constitute a switching output stage that steps down the input voltage Vin fed to the input terminal IN to yield a desired output voltage Vout at the output terminal OUT. The high-side and low-side transistors TH1 and TL1 may be incorporated in a semiconductor integrated circuit device as shown in FIG. 1A, or may be externally connected to a semiconductor integrated circuit device as shown in FIG. 1B.

On the other hand, the error amplification circuit 3, the PWM comparator 5, the slope signal generation circuit 11, the oscillator 12, and the PWM control circuit 13 are, as a switching driver that drives the high-side and low-side transistors TH1 and TL1 complementarily by current mode control according to the low-pass filter output voltage Vlpf, incorporated into the semiconductor integrated circuit device.

Figure 2:
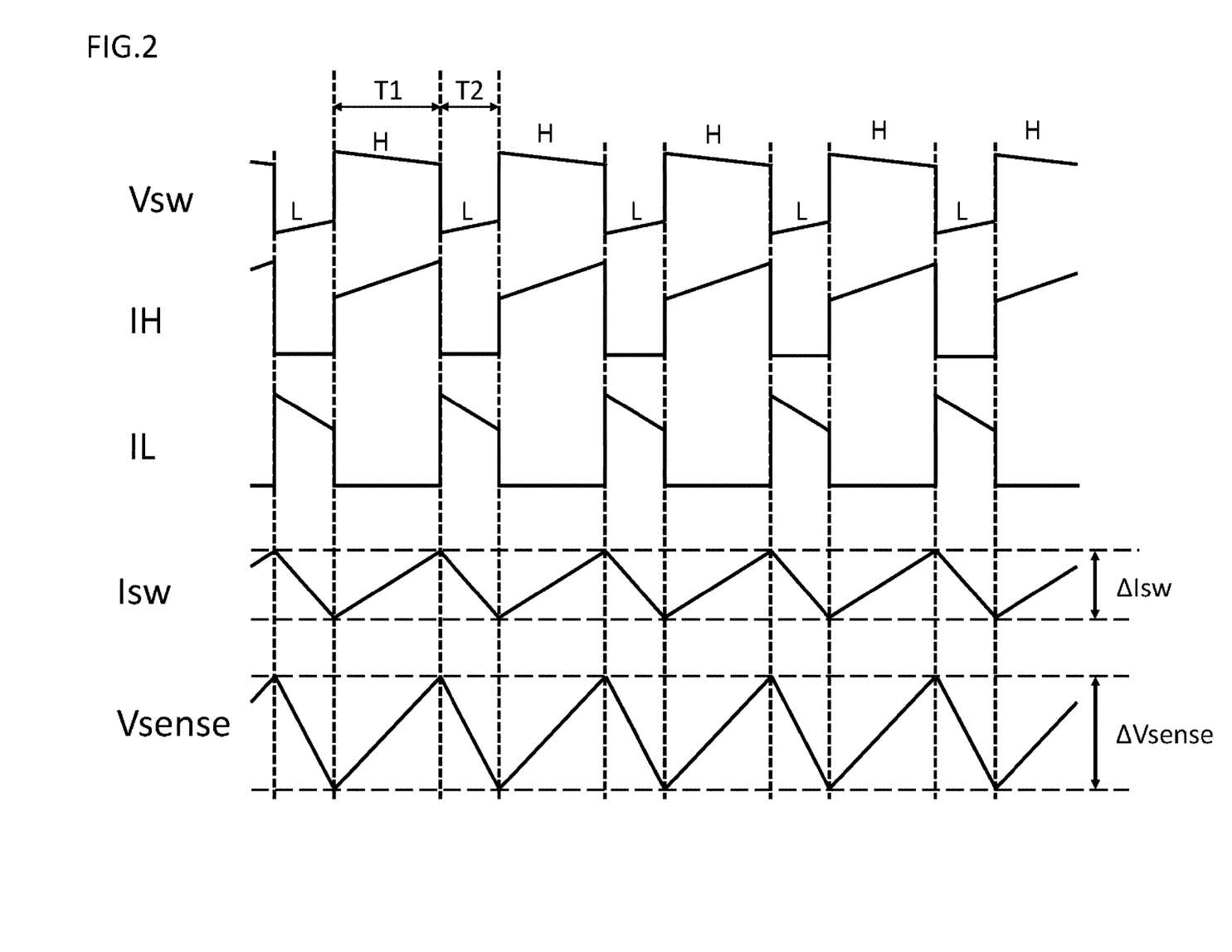
FIG. 2 is a diagram showing signal waveforms at relevant nodes in FIGS. 1A and 1B.

FIG. 2 shows the waveforms of signals at relevant nodes in the current mode control switching regulator 1 shown in FIGS. 1A and 1B. The switching voltage Vsw is output to the node N1. As mentioned earlier, the switching voltage Vsw is generated by complementary operation of the high-side and low-side transistors TH1 and TL. For the sake of convenience of drawing, FIG. 2 shows an example where the duty factor is about 65%, with the HIGH-level H period T1 longer than the LOW-level L period T2. In practice, the duty factor varies with how heavy or light the load RL coupled to the output terminal OUT is.

In FIG. 2, the high-side current IH is the current that passes in the high-side transistor TH1. The high-side current IH increases gradually during the period in which the switching voltage Vsw is at HIGH level H. The maximum value of the high-side current IH is, for example, about 400 mA. The low-side current IL is the current that passes in the low-side transistor TL1. The low-side current IL serves to feed a current from the ground potential GND side to the inductor L1 during the period in which the switching voltage Vsw is at LOW level L, that is, during the period in which the high-side transistor TH1 is OFF. The maximum value of the low-side current IL is, like that of the high-side current IH, about 400 mA. The inductor current Isw is the current that passes in the inductor L1. The inductor current Isw is the sum current of the high-side and low-side currents IH and IL. The inductor current Isw has a triangular waveform, and its amplitude value is represented by the symbol ΔIsw. The amplitude value ΔIsw is, for example, about 100 mA. The sum voltage Vsense is extracted from a node N4, which is the output of the summator 8, that is, from the summing resistor R4. The amplitude value ΔVsense of the sum voltage Vsense is, for example, about 1 mV, which is a very small value and is shown magnified in the drawings.

Figure 3A:
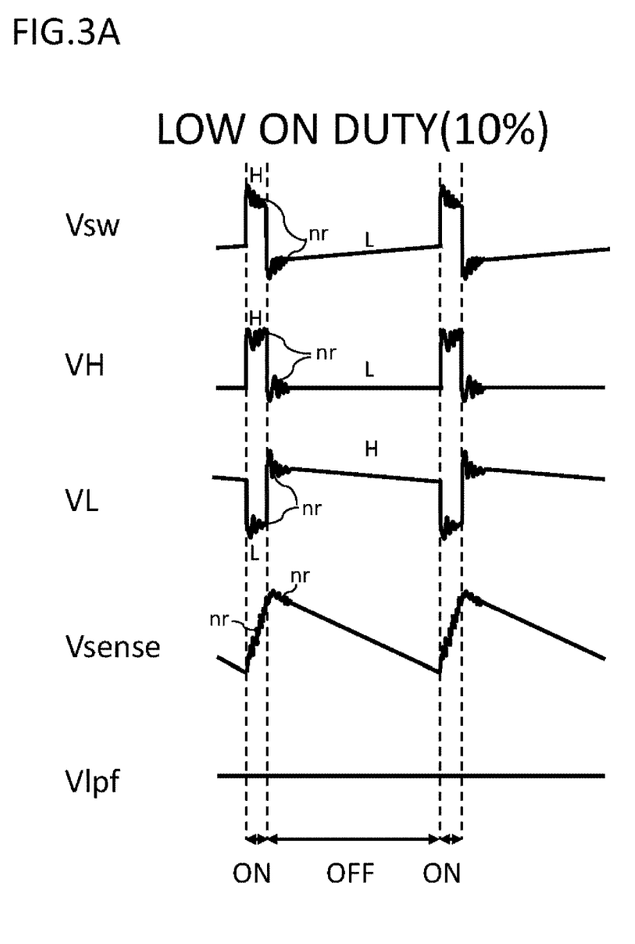
FIG. 3A is a schematic diagram showing ringing noise contained in relevant signals and voltages when the ON duty factor of the high-side transistor is low in FIGS. 1A and 1B.
Figure 3B:
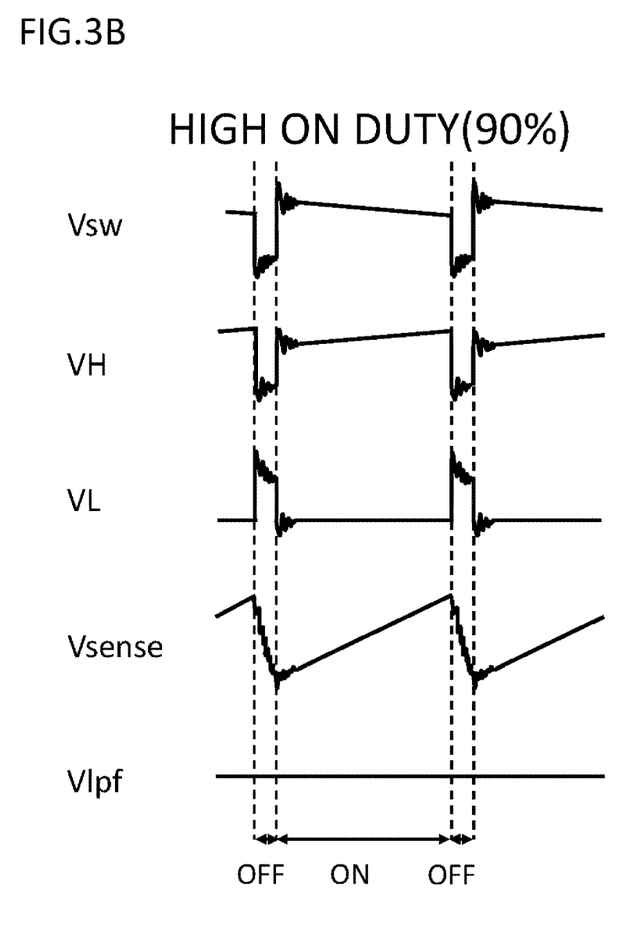
FIG. 3B is a schematic diagram showing ringing noise contained in relevant signals and voltages when the ON duty factor of the high-side transistor is high in FIGS. 1A and 1B.

FIGS. 3A and 3B are subsidiary to FIG. 2, and schematically show states where the switching voltage Vsw contains ringing noise. Ringing noise occurs when the high-side and low-side transistors TH1 and TL1 each turn from an OFF state to an ON state with opposite phases respectively. FIGS. 3A and 3B schematically show relevant voltage/signal waveforms in two different state respectively, specifically one where the duty factor of the switching voltage Vsw output to the node N1 in FIGS. 1A and 1B is comparatively low, for example about 10% and one where it is comparatively high, for example about 90%.

FIG. 3A shows a case where the duty factor is low, and FIG. 3B shows a case where the duty factor is high. In FIG. 3A, the switching voltage Vsw contains ringing noise nr which appears as irregular variations in amplitude width/value with the passage of time. The high-side sense voltage VH is the drain-source voltage of the high-side transistor TH1. FIG. 3A shows how ringing noise occurs during the HIGH-level H period of the high-side sense voltage VH and immediately after it turns from HIGH level H to LOW level L. The influence of the ringing noise nr is greater the shorter the period T of the switching voltage Vsw, that is, the higher its frequency.

The low-side sense voltage VL is the source-drain voltage of the low-side transistor TL1. FIG. 3A shows how ringing noise occurs during the LOW-level L period of the low-side sense voltage VL and immediately after it turns from LOW level L to HIGH level H. The influence of the ringing noise nr is greater the shorter the period T of the switching voltage Vsw, that is, the higher its frequency.

In FIGS. 3A and 3B, the sum sense voltage Vsense is output to the node N4. The sum sense voltage Vsense is the voltage which is the sum of the high-side and low-side sense voltages VH and VL. In the illustrated states, although the sum sense voltage Vsense contains slight ringing noise, it is attenuated compared with that contained in the high-side and low-side sense voltages VH and VL. The low-pass filter output voltage Vlpf is output from the low-pass filter 10, and in the illustrated states, ringing noise has been smoothed so that almost none is contained in it. The low-pass filter output voltage Vlpf determines the direct-current level of the slope signal Vsl generated in the slope signal generation circuit 11 in the succeeding stage. The slope signal Vsl, which is set at a predetermined direct-current level, is compared with the error signal Verr in the PWM comparator 5, so that current mode control is carried out.

Figure 4:
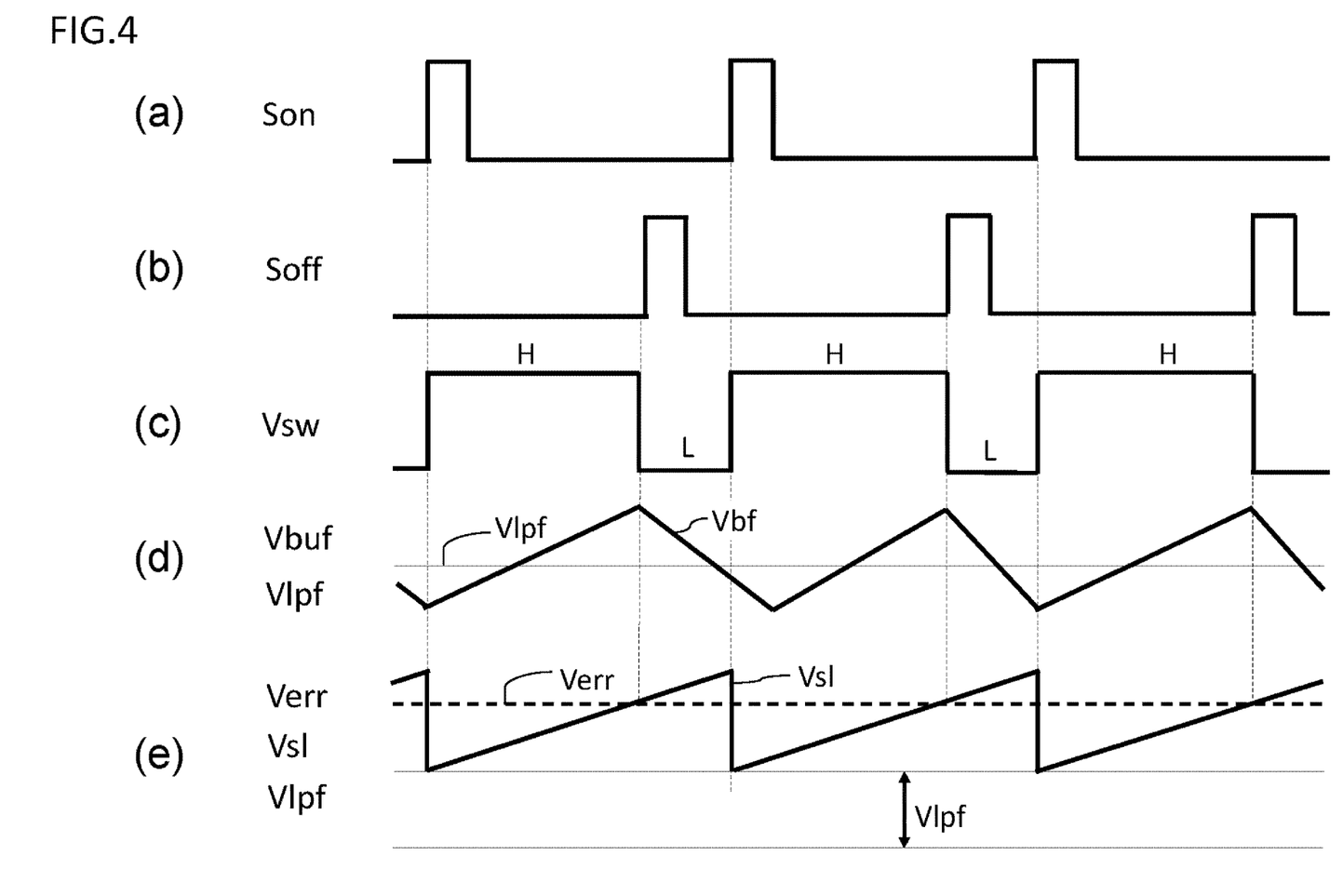
FIG. 4 is a diagram showing signal waveforms at relevant nodes in FIGS. 1A and 1B other than the nodes shown in FIG. 2.

FIG. 4 shows voltages and signals other than those at the nodes shown in FIGS. 2, 3A, and 3B which have been described previously.

FIG. 4 shows, in row (a), the set signal Son output from the node N5, that is, from the oscillator 12. The set signal Son serves as a set signal for the PWM logic circuit 13, and also serves as a reference signal for the generation of the slope signal Vsl.

FIG. 4 shows, in row (b), the reset signal Soff output from the PWM comparator 5. The reset signal Soff serves as a reset signal for the PWM logic circuit 13.

FIG. 4 shows, in row (c), the switching voltage Vsw output to the node N1, which is the same as the switching voltage Vsw shown in FIGS. 2, 3A, and 3B but is here slightly reshaped. The switching voltage Vsw turns from HIGH level H to LOW level L at a rising edge in the reset signal Soff.

FIG. 4 shows, in row (d), the buffer output voltage Vbuf output from the buffer 9 and the low-pass filter output voltage Vlpf output from the low-pass filter 10. The buffer output voltage Vbuf is the same as the sum sense voltage Vsense output to the node N4.

FIG. 4 shows, in row (e), the error signal Verr output from the phase compensation circuit 4, the low-pass filter output voltage Vlpf output from the low-pass filter 10, and the slope signal Vsl output from the slope signal generation circuit 11. The direct-current level of the slope signal Vsl is determined by the low-pass filter output voltage Vlpf. The relationship between the direct-current levels of the slope signal Vsl and the low-pass filter output voltage Vlpf is shown also in FIG. 5, which will be referred to later. The direct-current level of the low-pass filter output voltage Vlpf shifts based on the magnitudes of the high-side current IH passing in the high-side transistor TH1 and the low-side current IL passing in the low-side transistor TL1. This controls the direct-current level of the slope signal Vsl. Thus, in the PWM comparator 5, the level for comparison with the error signal Verr shifts, so that the current mode control switching regulator 1 operates as such. The low-pass filter output voltage Vlpf has ringing noise smoothed by the oscillator 12, and is thus output generally as a direct-current output voltage. At the time that the error signal Verr and the slope signal Vsl cross each other, the reset signal Soff shown in row (b) in FIG. 4 rises. The switching voltage Vsw shown in row (c) in FIG. 4 is at HIGH level H during the period in which the slope signal Vsl is lower than the error signal Verr, and is at LOW level L during the period in which the slope signal Vsl is higher than the error signal Verr.

Figure 5:
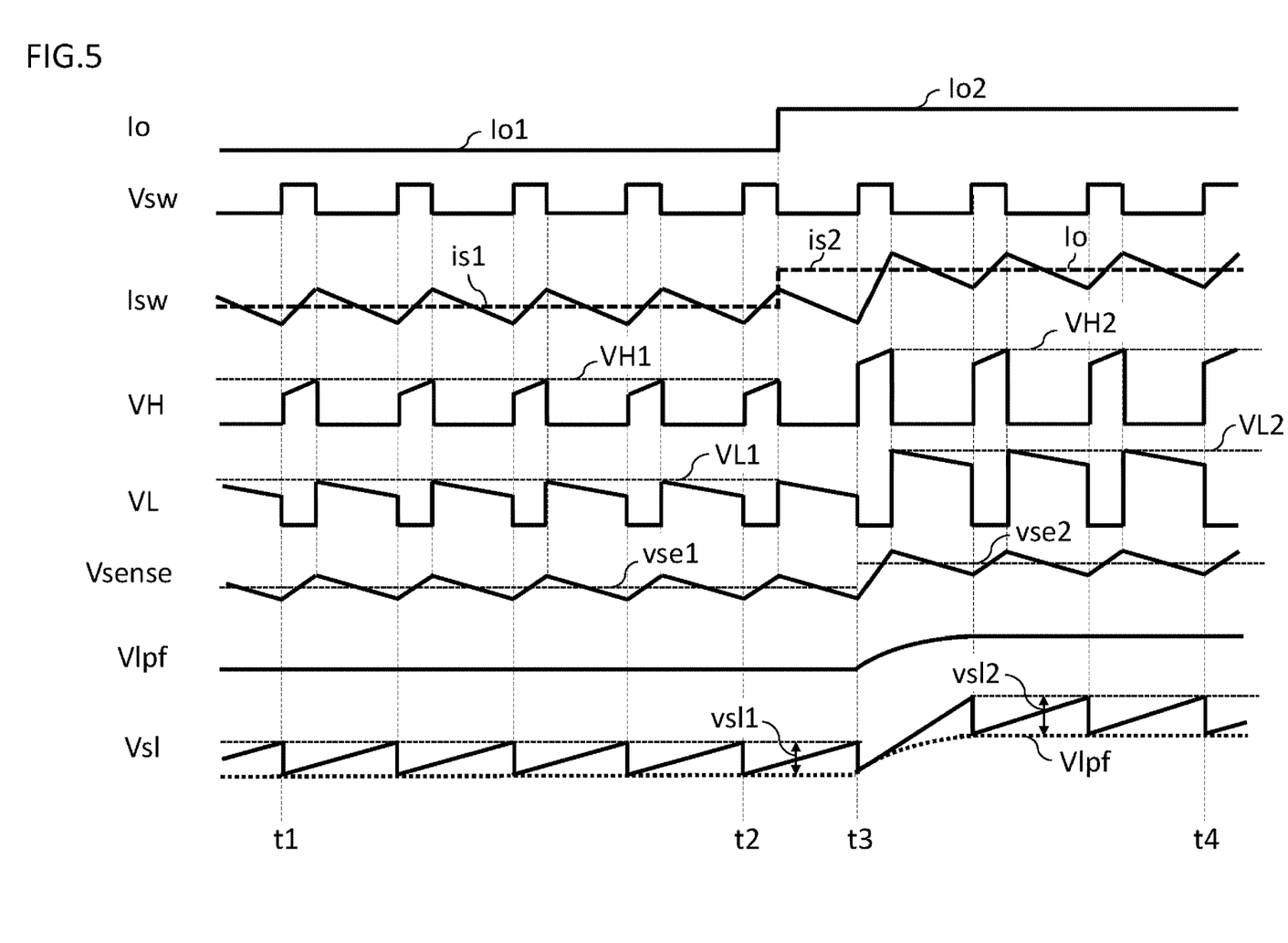
FIG. 5 is a signal waveform diagram illustrating the voltage and signals output from a summator 8, a low-pass filter 10, and a slope signal generation circuit 11 which characterize the present invention.

FIG. 5 is a signal waveform diagram illustrating the processes of generating, among the relevant voltages and signals in FIGS. 1A and 1B, the composite voltage Vsense output from the summator 8, the low-pass filter output voltage Vlpf output from the low-pass filter 10, and the slope signal Vsl output from the slope signal generation circuit 11. The generation of these voltages and signals involves other voltages, currents, and signals, of which some will also be described briefly with reference to FIGS. 1A and 1B.

A load current Io is the current that passes in the load RL. As illustrated, as the load current Io, a comparatively low load current Io1 occurs from time point t1 to time point t2, and a comparatively high load current Io2 occurs at time points t2, t3, and t4. That is, as illustrated, starting at time point t2, the load RL starts to be fed with the comparatively high load current Io2.

The switching voltage Vsw is output from the node N1. The switching voltage Vsw feeds the inductor L1 with electromagnetic energy.

The switching current Isw passes in the inductor L1. As illustrated, the switching current Isw has a sawtooth or triangular waveform, and coordinates with the load current Io such that, at time point t2, the average level of the switching current Isw rises from is1 to is2.

The high-side sense voltage VH is the voltage appearing across the source and drain of the high-side transistor TH1, and follows the switching current Isw such that, while a comparatively low voltage VH1 occurs in the period from time point t1 to time point t2, a comparatively high voltage VH2 occurs in the period from time point t3 to time point t4.

The low-side sense voltage VL is the voltage appearing across the source and drain of the low-side transistor TL1, and, like the high-side sense voltage VH, follows the switching current Isw such that, while a comparatively low voltage VL1 occurs in the period from time point t1 to time point t2, a comparatively high voltage VL2 occurs in the period from time point t3 to time point t4.

The composite voltage Vsense is output from the summator 8. The composite voltage Vsense is a voltage that is the sum of the high-side and low-side sense voltages VH and VL. Consequently, the composite voltage Vsense follows the switching current Isw, and exhibits generally the same waveform as that of the switching current Isw. Accordingly, the average level of the composite voltage Vsense rises, at time points t2 and t3, from vsel1 to vsel2.

The low-pass filter output voltage Vlpf is output from the low-pass filter 10. The low-pass filter output voltage Vlpf is a voltage resulting from the composite voltage Vsense (more precisely, the buffer output voltage Vbuf) having high-frequency signal components in it filtered out by the low-pass filter 10. Practically, the low-pass filter output voltage Vlpf follows the shift of the composite voltage Vsense, gradually rising starting at time point t3. The low-pass filter output voltage Vlpf is fed to the slope signal generation circuit 11 in the succeeding stage.

The slope signal Vsl is generated in the slope signal generation circuit 11. The slope signal Vsl has a sawtooth or triangular waveform. The slope signal Vsl is generated, for example, through the charging or discharging of an unillustrated capacitor with a constant current. The level of the lower limit of the slope signal Vsl is determined by the low-pass filter output voltage Vlpf. Accordingly, the level of the lower limit of the slope signal Vsl follows the level of the low-pass filter output voltage Vlpf, and thus starts to rise gradually at time point t3. The slope signal Vsl is so set that there is no change between the amplitude value vsl1 from its upper to lower limit value in the period from time point t1 to time point 2 and that Vsl2 after time point 3, that is, vsl1=vsl2. The relationship between the direct-current levels of the slope signal Vsl and the low-pass filter output voltage Vlpf is shown also in row (e) in FIG. 4 previously referred to.

Second Embodiment

Figure 6A:
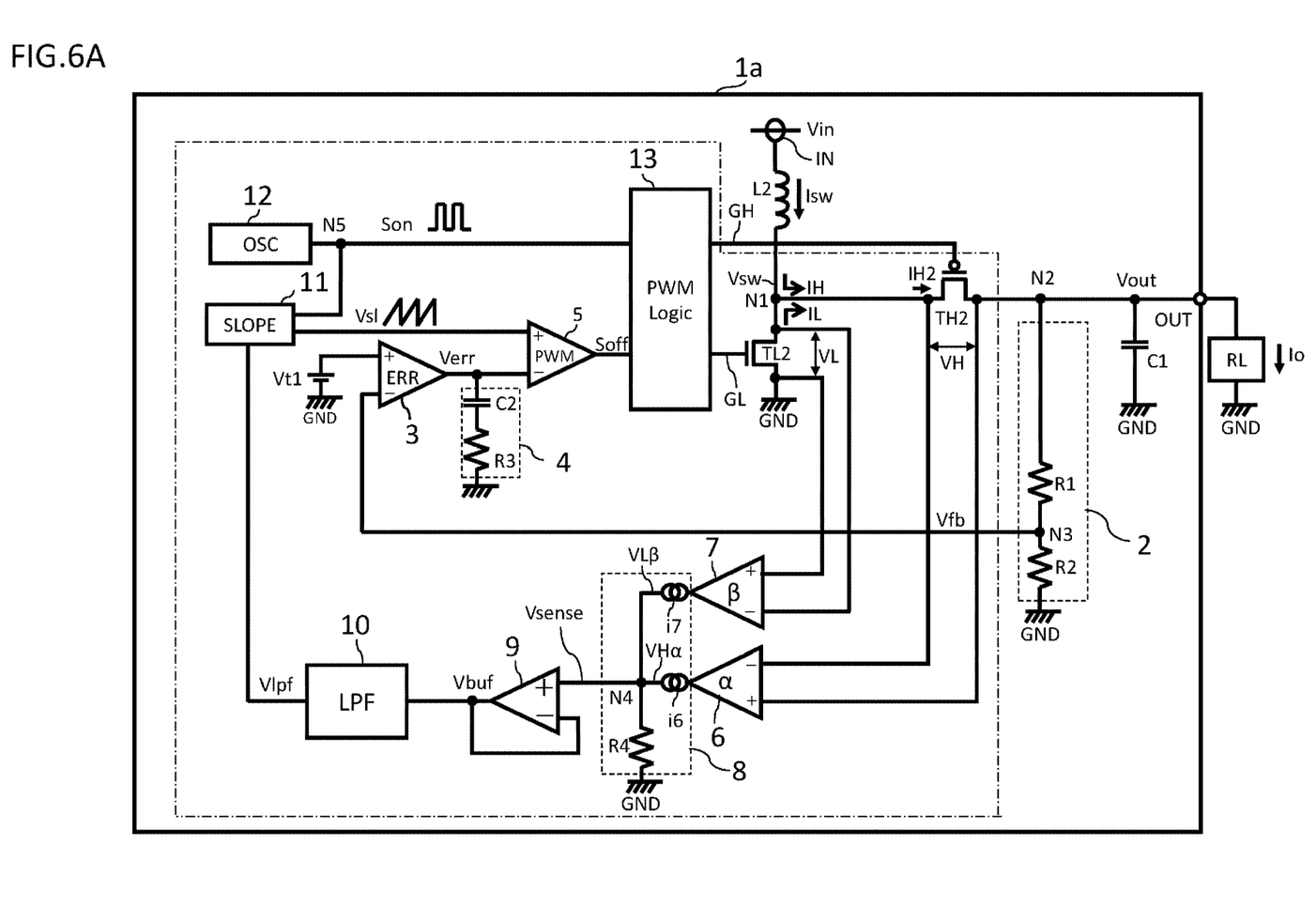
FIG. 6A is a circuit configuration diagram of an electronic device provided with a current mode control switching regulator of a step-up type (with transistors incorporated) according to a second embodiment of the present invention.
Figure 6B:
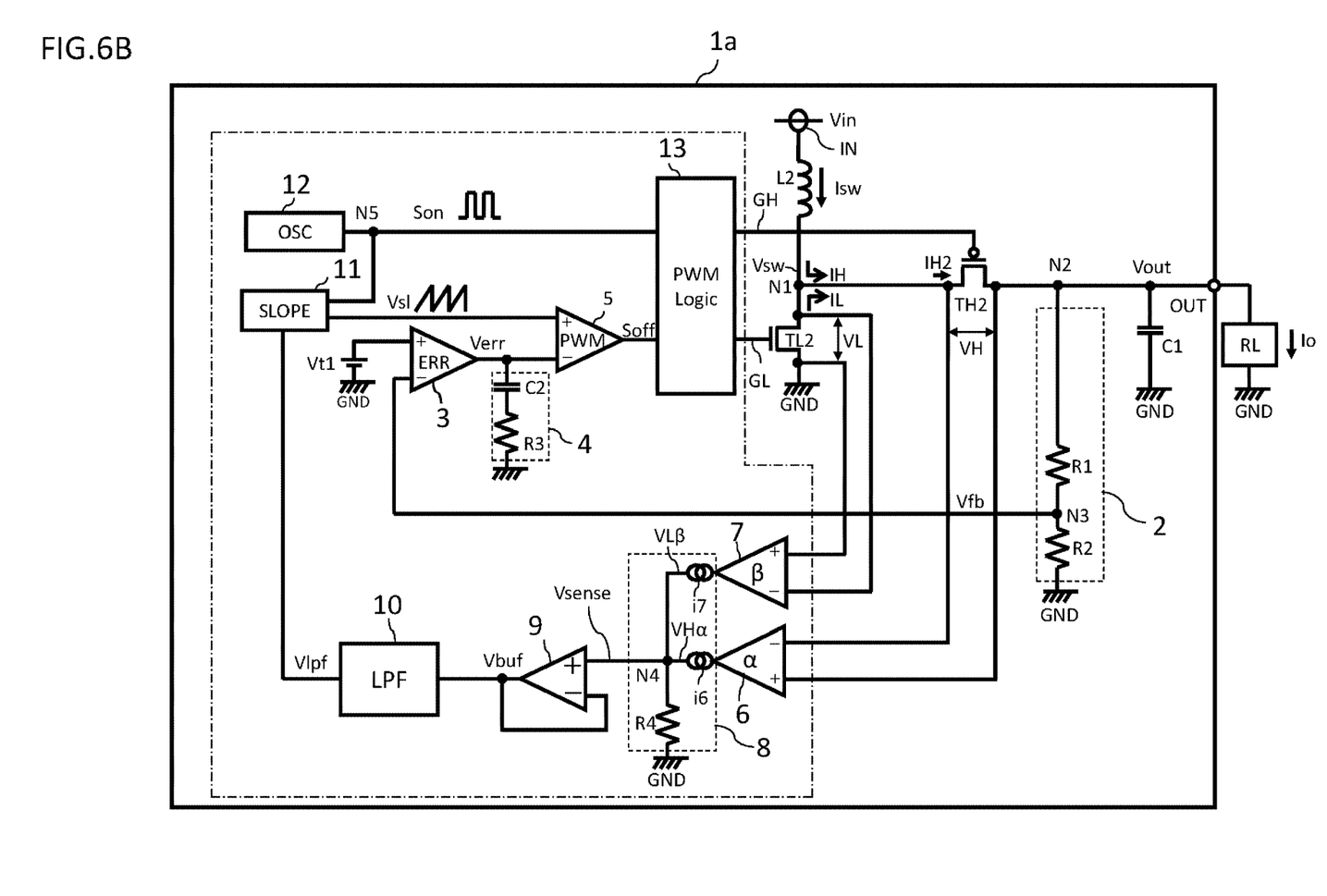
FIG. 6B is a circuit configuration diagram of an electronic device provided with a current mode control switching regulator of a step-up type (with transistors externally connected) according to the second embodiment of the present invention.

FIGS. 6A and 6B are circuit configuration diagrams of electronic devices provided with a current mode control switching regulator of a step-up type according to the present invention. In these diagrams, components enclosed in a dash-dot-line box are to be understood as components integrated in a semiconductor integrated circuit device. The current mode control switching regulator 1a of the step-up type steps up an input voltage Vin to yield an output voltage Vout at an output terminal. In the current mode control switching regulator 1a shown in FIGS. 6A and 6B, to an input terminal IN to which the input voltage Vin is fed, one end of an inductor L2 is connected, and the other end of the inductor L2 is connected to the drain of a low-side transistor TL2 (corresponding to an output switch). The drain of the low-side transistor TL2 and the source of a high-side transistor TH2 (corresponding to a synchronous rectification switch) are connected together. The connection point between them is a node N1. The source of the low-side transistor TL2 is connected to a ground potential GND. The high-side transistor TH2 and the low-side transistor TL2 function as switching transistors that turn ON and OFF repeatedly based respectively on a high-side gate signal GH and a low-side gate signal GL output from a PWM control circuit 13 and thereby control an inductor current Isw passed in the inductor L2.

The high-side transistor TH2 is a pMOS transistor, and the low-side transistor TL2 is an nMOS transistor. As the high-side and low-side transistors TH2 and TL2, IGBTs or the like can also be used. The high-side and low-side transistors TH2 and TL2 may instead be bipolar transistors.

In FIGS. 6A and 6B, a node N2 is connected to the output terminal OUT. To the node N2 are connected one end of a resistor R1 and one end of a smoothing capacitor C1. The other end of the smoothing capacitor C1 is connected to a ground potential GND. To the output terminal OUT, a load RL is connected. The load RL is, for example, a CPU. The other end of the resistor R1 is, together with one end of a resistor R2, connected to a node N3, and the other end of the resistor R2 is connected to the ground potential GND.

A feedback voltage generation circuit 2 is composed of the resistors R1 and R2, which are connected in series between the node N2 and the ground potential GND, and outputs, at the node N3, which is the connection point between those resistors, a feedback voltage Vfb. The feedback voltage Vfb is fed to the inverting input terminal of an error amplification circuit 3. The non-inverting input terminal of the error amplification circuit 3 is fed with a reference voltage Vt1. The output terminal of the error amplification circuit 3 is connected to a phase compensation circuit 4.

A high-side amplifier 6, like the one in FIGS. 1A and 1B, comprises, for example, an operational amplifier, and senses a high-side current IH2 that passes in the high-side transistor TH2. The high-side current IH2 is sensed by sensing the voltage drop across the source and drain of the high-side transistor TH2. This sensing method is the same as in the current mode control switching regulator 1 of the step-down type in FIGS. 1A and 1B, and accordingly no overlapping description will be repeated. A low-side amplifier 7 comprises, for example, an operational amplifier, and senses a low-side current IL2 that passes in the low-side transistor TL2. The low-side current IL2 is sensed by sensing the voltage drop across the source and drain of the low-side transistor TL2. This sensing method, too, is the same as in the current mode control switching regulator 1 of the step-down type in FIGS. 1A and 1B, and accordingly no overlapping description will be repeated.

In short, the current mode control switching regulator 1a of the step-up type shown in FIGS. 6A and 6B differs from the current mode control switching regulator 1 of the step-down type shown in FIGS. 1A and 1B in the interconnection among the input terminal IN, the high-side transistor TH2, the low-side transistor TL2, and the inductor L2, and in other respects both have the same circuit configuration and interconnection; accordingly, no overlapping description will be repeated. The high-side and low-side transistors TH2 and TL2 may be incorporated in a semiconductor integrated circuit device as shown in FIG. 6A, or may be externally connected to a semiconductor integrated circuit device as shown in FIG. 6B.

Overview:

To follow is a general description of the different embodiments described above.

A current mode control switching regulator according to one configuration disclosed herein includes the following constituent elements:

(a) a switching circuit configured to convert an input voltage into a predetermined output voltage and yield the output voltage, including a high-side transistor and a low-side transistor;

(b) an inductor configured to be switched between storing and discharging of energy as the switching circuit performs switching operation;

(c) a smoother configured to receive the energy discharged from the inductor and smooth the output voltage;

(d) an output terminal from which the output voltage extracted from the smoothing circuit is output;

(e) an error signal voltage generation circuit configured to generate an error signal voltage commensurate with the difference between the output voltage, or a feedback voltage commensurate with it, and a predetermined reference voltage;

(f) a high-side voltage sensor and a low-side voltage sensor respectively configured to convert currents passing in the high-side and low-side transistors into voltages;

(g) a high-side sense voltage amplifier and a low-side sense voltage amplifier respectively configured to amplify the sense voltages output from the high-side and low-side voltage sensors;

(h) a sense voltage summator configured to add up the amplified output voltages output from the high-side and low-side sense voltage amplifiers;

(i) a low-pass filter configured to smooth the sum voltage output from the sense voltage summator;

(j) a PWM comparator configured to compare the output voltage of the low-pass filter and a slope signal and generates a PWM signal of which the pulse duty factor is controlled; and (k) a PWM control circuit configured to make the high-side and low-side transistors perform switching operation based on the PWM output signal from the PWM comparator.

In a current mode control switching regulator according to another configuration disclosed herein, the high-side voltage sensor is the ON resistance of the high-side transistor, and the low-side voltage sensor is the ON resistance of the low-side transistor.

In a current mode control switching regulator according to another configuration disclosed herein, when the current that passes in the high-side transistor is represented by IH, the ON resistance of the high-side transistor is represented by RonH, the voltage amplification factor of the high-side sense voltage amplifier is represented by a, the current that passes in the low-side transistor is represented by IL, the ON resistance of the low-side transistor is represented by RonL, and the voltage amplification factor of the low-side sense voltage amplifier is represented by P, then the equation IH×RonH×α=IL×RonL×β is fulfilled.

In a current mode control switching regulator according to another configuration disclosed herein, the voltages amplified by the high-side and low-side amplifiers are converted into currents and are output respectively from the output stages of the high-side and low-side amplifiers.

In a current mode control switching regulator according to another configuration disclosed herein, the summator includes a summing resistor that is coupled with the output stages of the high-side and low-side amplifiers.

In a current mode control switching regulator according to another configuration disclosed herein, the sum signal is applied via a buffer to the low-pass filter.

According to the various embodiments disclosed herein, despite a comparatively simple circuit configuration, the ringing noise that occurs when the high-side and low-side transistors respectively turn ON and OFF is added up, and while the sum of the noise components is suppressed with the low-pass filter, the current mode control switching regulator is controlled. Thus, it is possible to provide a current mode control switching regulator that avoids the influence of ringing noise.

INDUSTRIAL APPLICABILITY

As will be clear from what has been discussed above, despite its simple circuit configuration, a current mode control switching regulator according to the present invention can eliminate the influence of ringing noise, and boasts high industrial applicability.

What is claimed is:

1. A control device operable to serve as an agent for controlling a switching regulator including an output switch and a synchronous rectification switch, the control device comprising:
   a summator configured to generate a sum sense signal by adding up a first sense signal commensurate with a current passing in the output switch and a second sense signal commensurate with a current passing in the synchronous rectification switch;
   a low pass filter configured to generate a smoothed sense signal by smoothing the sum sense signal; and
   a switch driver configured to drive the output switch and the synchronous rectification switch complementarily through current mode control based on the smoothed sense signal, wherein
   the switch driver includes:
      a slope signal generation circuit configured to receive a set signal so as to generate a slope signal commensurate with the smoothed sense signal;
      an oscillator configured to generate the set signal at a predetermined oscillation frequency;
      an error amplification circuit configured to generate an error signal commensurate with a difference between an output voltage of the switching regulator, or a feedback voltage commensurate therewith, and a predetermined reference voltage;
      a PWM (pulse width modulation) comparator configured to generate a reset signal by comparing the slope signal with the error signal; and
      a PWM control circuit configured to generate driving signals for the output switch and the synchronous rectification switch respectively based on the set signal and the reset signal, wherein
   the smoothed sense signal is not input to the PWM comparator, but is input to the slope signal generation circuit.

2. The control device according to claim 1, further comprising:
   a buffer configured to feed the sum sense signal to the low pass filter.

3. The control device according to claim 1, wherein a phase compensation circuit is connected to an output terminal of the error amplification circuit.

4. A control device operable to serve as an agent for controlling a switching regulator including an output switch and a synchronous rectification switch, the control device comprising:
   a first amplifier configured to generate a first amplified sense signal by amplifying a first sense signal commensurate with a current passing in the output switch;
   a second amplifier configured to generate a second amplified sense signal by amplifying a second sense signal commensurate with a current passing in the synchronous rectification switch;
   a summator configured to generate a sum sense signal by adding up the first and second amplified sense signals;
   a low pass filter configured to generate a smoothed sense signal by smoothing the sum sense signal; and
   a switch driver configured to drive the output switch and the synchronous rectification switch complementarily through current mode control based on the smoothed sense signal, wherein
   the switch driver includes:
      a slope signal generation circuit configured to receive a set signal so as to generate a slope signal commensurate with the smoothed sense signal;
      an oscillator configured to generate the set signal at a predetermined oscillation frequency;
      an error amplification circuit configured to generate an error signal commensurate with a difference between an output voltage of the switching regulator, or a feedback voltage commensurate therewith, and a predetermined reference voltage;
      a PWM (pulse width modulation) comparator configured to generate a reset signal by comparing the slope signal with the error signal; and
      a PWM control circuit configured to generate driving signals for the output switch and the synchronous rectification switch respectively based on the set signal and the reset signal, wherein
   the smoothed sense signal is not input to the PWM comparator, but is input to the slope signal generation circuit.

5. The control device according to claim 4, wherein the first and second amplified sense signals are both current signals.

6. The control device according to claim 4, wherein the summator includes a summing resistor configured to generate the sum sense signal by converting a sum current of the first and second amplified sense signals into a voltage.

7. A switching regulator comprising:
   a switching output stage configured to convert an input voltage into a predetermined output voltage and output the output voltage, the switching output stage including an output switch and a synchronous rectification switch; and
   a control device configured to control driving of the switching output stage, wherein
   the control device comprises:
      a summator configured to generate a sum sense signal by adding up a first sense signal commensurate with a current passing in the output switch and a second sense signal commensurate with a current passing in the synchronous rectification switch;
      a low pass filter configured to generate a smoothed sense signal by smoothing the sum sense signal; and
      a switch driver configured to drive the output switch and the synchronous rectification switch complementarily through current mode control based on the smoothed sense signal,
   wherein the switch driver includes:
      a slope signal generation circuit configured to receive a set signal so as to generate a slope signal commensurate with the smoothed sense signal;
      an oscillator configured to generate the set signal at a predetermined oscillation frequency;
      an error amplification circuit configured to generate an error signal commensurate with a difference between an output voltage of the switching regulator, or a feedback voltage commensurate therewith, and a predetermined reference voltage;
      a PWM (pulse width modulation) comparator configured to generate a reset signal by comparing the slope signal with the error signal; and
      a PWM control circuit configured to generate driving signals for the output switch and the synchronous rectification switch respectively based on the set signal and the reset signal, wherein
   the smoothed sense signal is not input to the PWM comparator, but is input to the slope signal generation circuit.

8. The switching regulator according to claim 7, wherein the switching output stage further includes:
- an inductor configured to be switched between storing and discharging of energy as the output switch and the synchronous rectification switch perform switching operation; and
- a capacitor configured to smooth the output voltage by receiving the energy discharged from the inductor.

9. The switching regulator according to claim 7, further comprising:
- a first current sensor and a second current sensor configured to generate the first and second sense signals respectively by sensing individually the currents passing in the output switch and the synchronous rectification switch.

10. The switching regulator according to claim 9, wherein the first current sensor is an ON resistance of the output switch, and the second current sensor is an ON resistance of the synchronous rectification switch.

11. The switching regulator according to claim 7, wherein the control device controls the switching output stage using pulse width modulation, such that $IH \times RonH \times \alpha = IL \times RonL \times \beta$, wherein:
- IH is a current passing in the output switch,
- RonH is the ON resistance of the output switch,
- α is an amplification factor of the first amplifier which amplifies the first sense signal,
- IL is a current passing in the synchronous rectification switch,
- RonL is the ON resistance of the synchronous rectification switch, and
- β is an amplification factor of the second amplifier which amplifies the second sense signal.

12. The switching regulator according to claim 7, wherein the output voltage is lower than the input voltage.

13. The switching regulator according to claim 12, wherein the output switch is a p-channel MOS (metal-oxide-semiconductor) field-effect transistor, and the synchronous rectification switch is an n-channel MOS field-effect transistor.

14. The switching regulator according to claim 7, wherein the output voltage is higher than the input voltage.

15. The switching regulator according to claim 14, wherein the output switch is an n-channel MOS (metal-oxide-semiconductor) field-effect transistor, and the synchronous rectification switch is a p-channel MOS field-effect transistor.

16. The switching regulator according to claim 7, wherein the output switch and the synchronous rectification switch are incorporated in a semiconductor integrated circuit device in which the control device is integrated.

17. The switching regulator according to claim 7, wherein the output switch and the synchronous rectification switch are externally connected to a semiconductor integrated circuit device in which the control device is integrated.

18. An electronic device comprising:
- the switching regulator according to claim 7; and
- a load configured to receive electric power from the switching regulator.

* * * * *